Sept. 7, 1937.   A. E. DIETRICH   2,092,666
ADJUSTABLE SEAT BACK
Filed Dec. 17, 1935   2 Sheets-Sheet 1
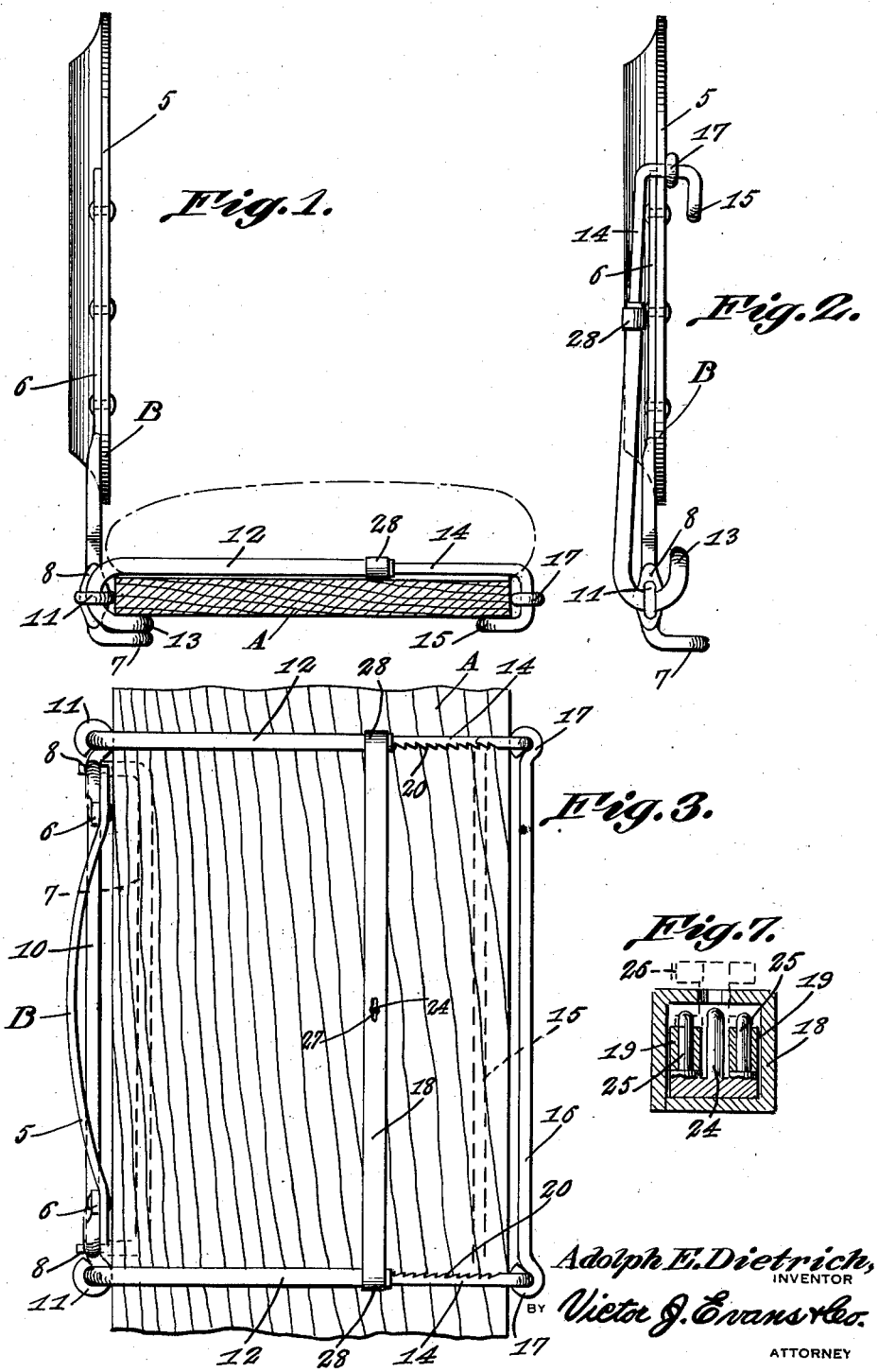

Sept. 7, 1937. A. E. DIETRICH 2,092,666
ADJUSTABLE SEAT BACK
Filed Dec. 17, 1935  2 Sheets-Sheet 2
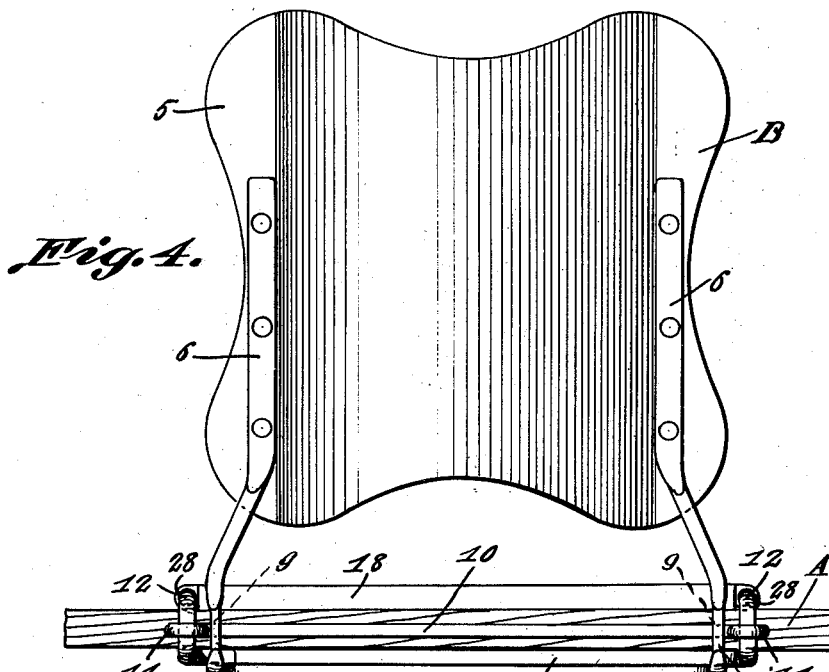
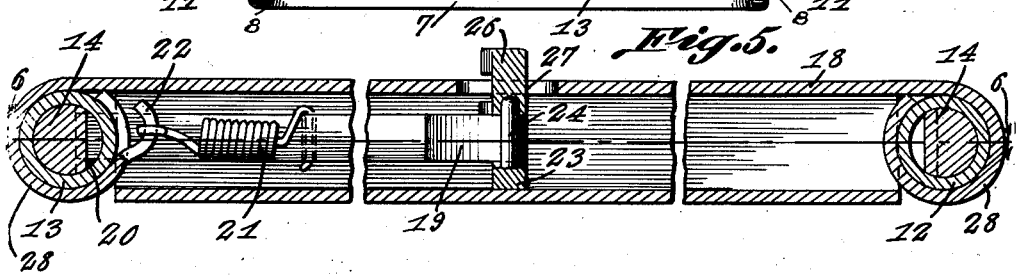
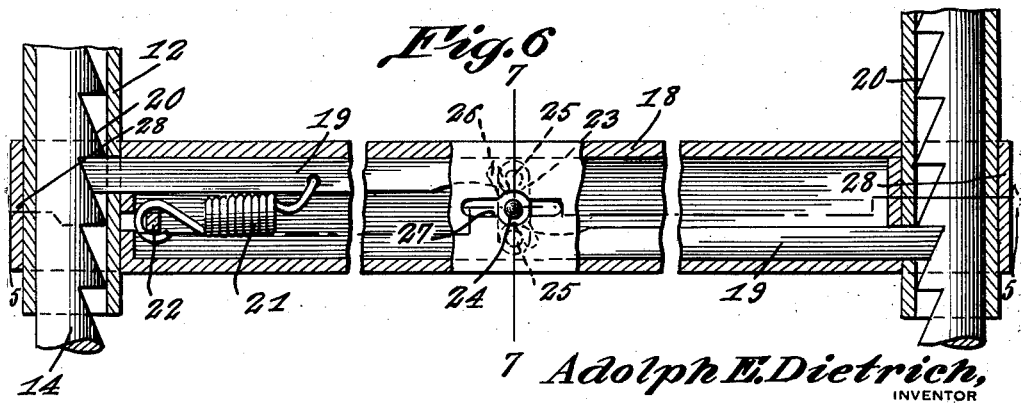
Adolph E. Dietrich, INVENTOR
BY Victor J. Evans & Co.
ATTORNEY Patented Sept. 7, 1937

2,092,666

UNITED STATES PATENT OFFICE 2,092,666

ADJUSTABLE SEAT BACK

Adolph Edward Dietrich, Delawanna, N. J.

Application December 17, 1935, Serial No. 54,934

1 Claim. (Cl. 155—133)

The invention relates to an adjustable seat back and more particularly to an adjustable and lockable bleacher seat back rest.

The primary object of the invention is the provision of a seat back of this character, wherein the same is susceptible of being folded into compact form and when unfolded can be mounted upon a board or seat as may be provided to sit on so that an occupant will have a back rest and such rest can be locked in place, the rest being adapted for bleacher seats in amusement parks or other like places.

Another object of the invention is the provision of a back of this character, wherein the construction thereof is novel in form and is readily and easily applied to a seat or removed therefrom and when applied will be latched thereto.

A further object of the invention is the provision of a back of this character, which is extremely simple in construction, thoroughly reliable and efficient in its purpose, the advantages in comfort being obvious and is susceptible of adjustment to accommodate itself to different widths of seats or boards for seating purposes, readily and easily locked in place to avoid fraudulent removal thereof, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a side elevation of the device constructed in accordance with the invention unfolded for use.

Figure 2 is a similar view showing the rest folded.

Figure 3 is a top plan view thereof in the position as shown in Figure 1.

Figure 4 is a rear elevation of the seat back applied.

Figure 5 is a sectional view on the line 5—5 of Figure 6 looking in the direction of the arrows.

Figure 6 is a sectional view on the line 6—6 of Figure 5 looking in the direction of the arrows.

Figure 7 is a sectional view on the line 7—7 of Figure 6.

Similar reference characters indicate corresponding parts throughout the several views in the drawings.

Referring to the drawings in detail, A designates generally a portion of a board employed in amusement parks for bleacher seats and B the adjustable seat back constituting the present invention and hereinafter fully described.

The seat back B comprises a section 5 constituting a back rest, it being shaped or curved to lend comfort in the use thereof and is carried by a pair of standards 6, these being constituted by a substantially U-shaped frame which has a folded substantially right angular closed end 7, the standards being formed with flattened areas 8, each provided with a hole 9 for accommodating a tie link 10 having eye terminals 11, these slidably receiving the side members 12 of a clamping yoke having the jaw 13, the side members being of tubular form and slidably accommodate the side members 14 of a companion clamping yoke having the jaw 15, the side members 14 of the latter yoke being telescoped in the side members 12 as will appear from Figure 3 of the drawings. The yoke having the side members 14 has a cross brace 16, its eye terminals 17 embracing the side members 14.

Disposed crosswise with respect to the side members 12 and carried thereby is a strap-like housing 18 in which are reversely shiftable latching bolts 19, these being engageable with rack teeth 20 as formed in the inner faces of the side members 14 and one of these latching bolts 19 has connected therewith a tensioning spring 21 which is attached at 22 to the housing 18 while pivoted to the inner ends of these bolts is a connecting link 23 supported for swinging movement on a center arbor 24 within the housing 18 and engageable with the pivots 25 connecting this link 23 with the bolts 19 is a releasable key 26, it being insertable in a keyhole 27 provided in the top of the housing 18 at the point of location of the said link and engageable with the arbor. The key 26 is adapted to throw the bolts 19 when inserted through the keyhole 27 and engaged with the pivots 25 for releasing the bolts from the racks 20 on the side members 14 and in this manner the clamping yokes having the jaws 13 and 15 can be detached from the board A to permit the freeing of the back rest therefrom.

When the back rest is free from the board A it can be readily folded into compact form as shown in Figure 2 of the drawings.

The strap housing 18 has the curled ends 28 embracing the side members 12 of the clamping yoke having the jaw 13.

In the use of the seat back the jaws 13 and 15 of the clamping yokes are brought into engaging position with the board A or the like and the latching bolts 19 will lock these yokes in clamping relation to each other for the fastening of the said back in place, it being apparent that the adjustable connection of the yokes permits the same to accommodate boards of different widths. When the yokes are clamped in place the back section 5 will be held in proper position for supporting the back of the occupant through the instrumentality of the bent end 7 which contacts with the jaw 13 next thereto of the clamping yoke which latter in turn contacts with the under side of the board when weight is against the section 5, the mounted position of the seat back being shown in Figures 1, 3 and 4 of the drawings.

It will be apparent from Figures 3, 5 and 7 of the drawings that the seat back can not be removed from its mounted position fraudulently because it is necessary that the clamping yokes be released from each other or unlatched by the key applicable for the turning of the link 23 to shift the bolts 19 against the resistance of the spring 21 and in this manner unlatching the members 14 from the members 12 of the clamping yokes.

The seat back when not in use can be folded in compact form so that it can be readily carried by a person from one locality to another.

What is claimed is:

An adjustable seat back comprising a back rest, a substantially U-shaped frame forming a pair of standards connected to said back rest and having a right angularly bent closed lower end, opposed front and rear clamping yokes formed with jaws for engaging a base, slidably interfitted side members comprised in said yokes, racks formed in the side members of one yoke, a housing disposed crosswise with respect to the side members of the other yoke and fixed thereto, reversely acting latching bolts within said housing and engageable with the racks for locking the said side members adjustably interfitted with each other, a key actuated turning link pivoted to the said bolts, a tie rod carried by one of the yokes and having the U-shaped frame pivoted thereon with the right angular bent portion engageable with the yoke carrying the tie rod for holding the said back upright against rearward swinging, and a spring means within the housing and active for normally holding the bolts in latching position.

ADOLPH E. DIETRICH.